United States Patent [19]
Cecil, Jr. et al.

[11] Patent Number: 6,139,346
[45] Date of Patent: Oct. 31, 2000

[54] PANEL MOUNTED CONNECTOR ASSEMBLY

[75] Inventors: Paul D. Cecil, Jr., Waukegan; Stephen A. Colleran, Lisle; Bill B. Wilson, Montgomery; Paul C. Berg; Julie Beyers Rutter, both of Batavia, all of Ill.

[73] Assignee: Molex Incorporated, Lisle, Ill.

[21] Appl. No.: 09/291,341

[22] Filed: Apr. 14, 1999

[51] Int. Cl.⁷ ..................................................... H01R 13/64
[52] U.S. Cl. ............................................. 439/247; 439/248
[58] Field of Search ................................... 439/247, 248, 439/545, 555, 556, 557, 547

[56] References Cited

U.S. PATENT DOCUMENTS 5,002,497  3/1991  Plocek et al. ........................... 439/248
5,931,688  8/1999  Hasz et al. .............................. 439/247

*Primary Examiner*—Paula Bradley
*Assistant Examiner*—Alexander Gilman
*Attorney, Agent, or Firm*—Stacey E. Caldwell

[57] ABSTRACT

A connector assembly is disclosed for mounting through an aperture in a panel. The assembly includes an adapter mountable in the aperture. A first connector is mountable to the adapter and has limited axial floating movement relative thereto. A second connector is mateable with the first connector with a given mating force. A latch-release mechanism is provided between the first connector and the adapter to latch the first connector against the floating movement and to allow the second connector to be mated with the first connector with the given mating force. The latch-release mechanism is released in response to a force greater than the given mating force to allow the limited floating movement and numerous mating cycles.

13 Claims, 4 Drawing Sheets

PANEL MOUNTED CONNECTOR ASSEMBLY

FIELD OF THE INVENTION

This invention generally relates to the art of connector assemblies, such as electrical connectors, fiber optic connectors and the like. More particularly, the invention relates to a latch-release system for allowing a connector to float or have limited movement relative to a mounting chassis, such as a panel, framework, backplane and the like.

BACKGROUND OF THE INVENTION

Electrical and other connector assemblies are used in a wide variety of applications wherein a connector is mounted through an aperture in a chassis such as a panel or the like. It often is desirable to mount the connector so that it has some degree of limited movement or "float" relative to the chassis or panel. For instance, in an automotive application, the chassis or panel and its mounted connector must be assembled in relation to another frame component or a printed circuit board, backplane or the like. By providing some degree of floating movement for the connector, accommodation is made for manufacturing tolerances when the entire system is assembled.

On the other hand, if a connector is mounted in a panel with floating movement relative thereto, it often is difficult to mate a complementary connector with the panel-mounted connector because the panel-mounted connector shifts around due to its floating movement. The present invention is directed to solving this problem by providing a unique latch-release system wherein a panel-mounted connector is latched against any floating movement relative to the panel to allow easy mating of a second connector, and the board-mounted connector is released after mating to allow limited floating movement of the connector relative to the panel.

SUMMARY OF THE INVENTION

An object, therefore, of the invention is to provide a new and improved connector assembly of the character described for mounting through an aperture in a panel, whereby the aperture defines an axis such as a mating axis.

In the exemplary embodiment of the invention, the assembly includes a mounting bracket or adapter mountable in the aperture in the panel. A first connector is insertable axially into the adapter and has limited axial floating movement relative to the adapter. A second connector is mateable axially with the first connector with a given mating force. The invention contemplates the provision of complementarily interengaging latch-release means between the first connector and the adapter to latch the first connector against the axial floating movement and to allow the second connector to be mated with the first connector with the given mating force. The latch-release means is released in response to a force greater than the given mating force to allow limited axial floating movement between the first connector and the adapter and, thereby, between the mated connectors and the panel.

As disclosed herein, the first and second connectors have complementarily interengaging male and female terminals which substantially define the given mating force between the connectors. The complementarily interengaging latch means comprise interengaging detent surfaces on the first connector and on the adapter. At least one of the detent surfaces is at an angle to define a release force greater than the given mating force. Specifically, the latch-release means comprise a triangulated detent boss on one of the first connector and the adapter movable between a pair of opposed detent surfaces on the other of the first connector and the adapter.

According to another aspect of the invention, complementarily interengaging reset means are provided between the first connector and the adapter to cause the latch-release means to relatch in response to a reset force less than an unmating force being applied to the second connector in an unmating direction. As disclosed herein, the reset means comprise interengaging detent surfaces on the first connector and on the adapter. At least one of the detent surfaces is at an angle to define a reset force less than the unmating force. In the preferred embodiment, the triangulated detent boss which defines a portion of the latch-release means is shaped in the form of a diamond to provide both the angled detent surfaces of the latch-release means as well as the angled detent surfaces of the reset means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
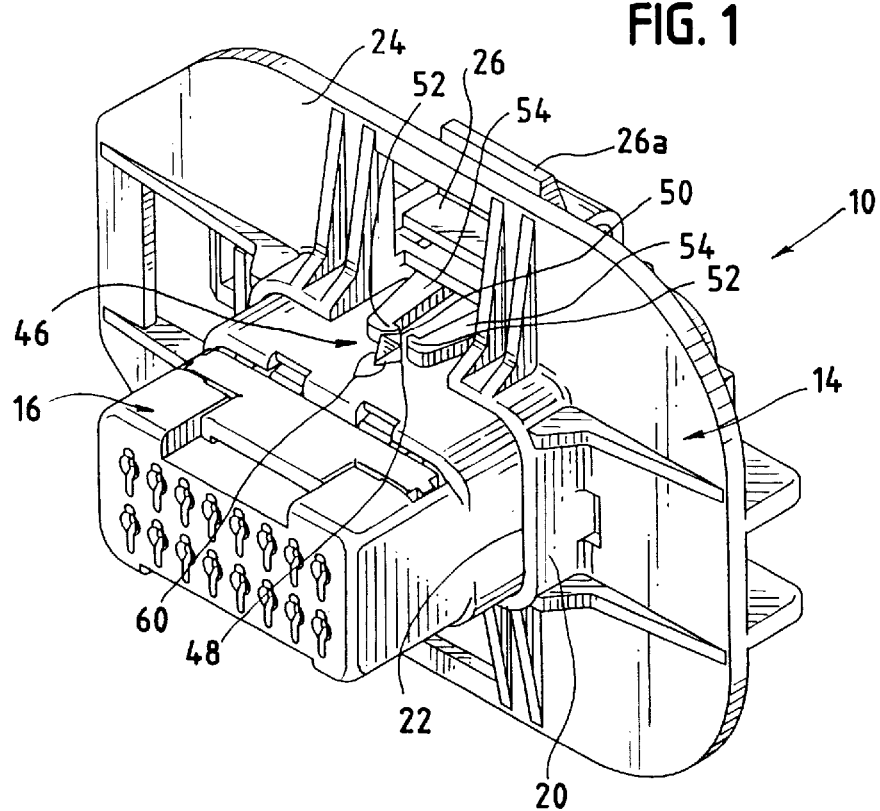
FIG. 1 is a perspective view of the panel mounted connector inserted through a receptacle in the panel mounting adapter.
Figure 2:
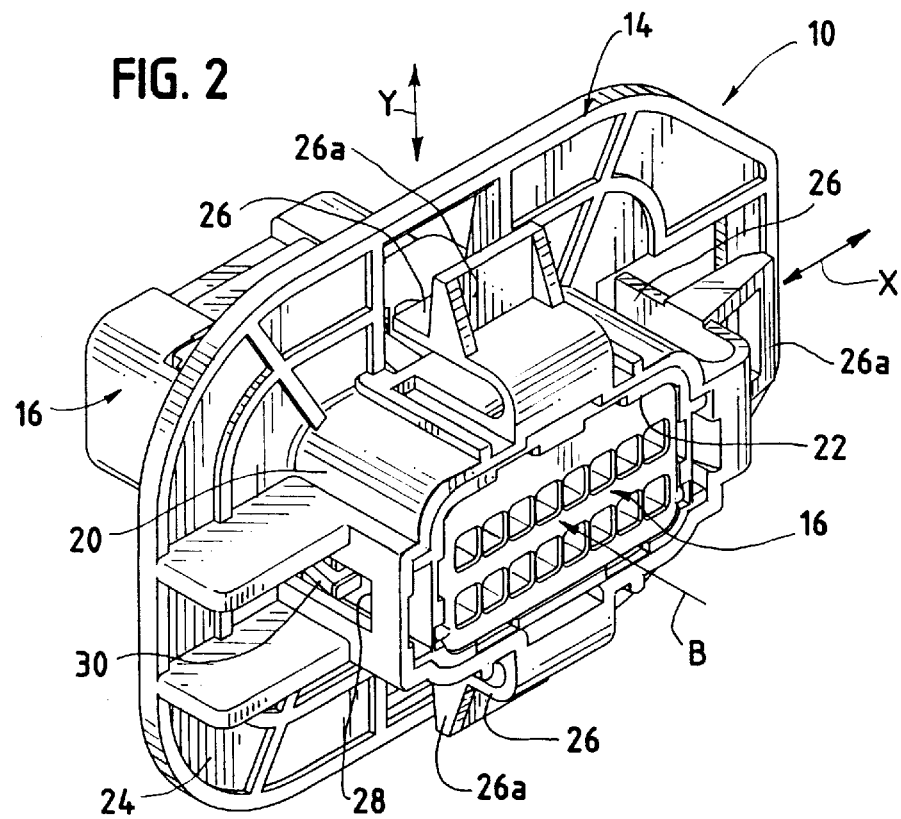
FIG. 2 is a perspective view looking toward the back side of the assembly of FIG. 1.

Referring to the drawings in greater detail, and first to FIGS. 1 and 2, the invention is embodied in an electrical connector assembly, generally designated 10, for mounting through an aperture in a panel (not shown). The assembly includes a mounting bracket or adapter, generally designated 14, and a first or panel mounted connector, generally designated 16. A second or mating connector, generally designated 18 (FIG. 3), is mateable with the first or panel mounted connector 16 in the direction of arrow "A".

Adapter 14 includes a central body 20 defining a through receptacle 22 into which connector 16 is inserted in the direction of arrow "B" (FIG. 2). A peripheral flange 24 projects radially outwardly around central body 20. A flexible cantilevered arm 26 is provided on each of three sides of central body 20 to allow the adapter to be mounted in a cutout-type aperture in the panel such as at an edge of the panel. An abutment flange 26a projects radially outwardly from each cantilevered arm 26. When the bracket is mounted in the cutout in the panel, central body 20 of the bracket is disposed in the cutout or aperture, and the panel is sandwiched between abutment flanges 26a and peripheral flange 24 of the bracket. Flexible arms 26 provide relative floating action between the bracket and the panel in the "X" and "Y" directions (i.e., parallel to the panel). A locking hole 28 (FIG. 2) is provided in each side wall of central body 20 of the bracket for receiving a locking member 30 from connector 16, as will be seen in greater detail hereinafter. The entire bracket 14, including peripheral flange 24 and, flexible cantilevered arms 26, is a one-piece structure which can be molded of dielectric material such as plastic or the like.

Figure 3:
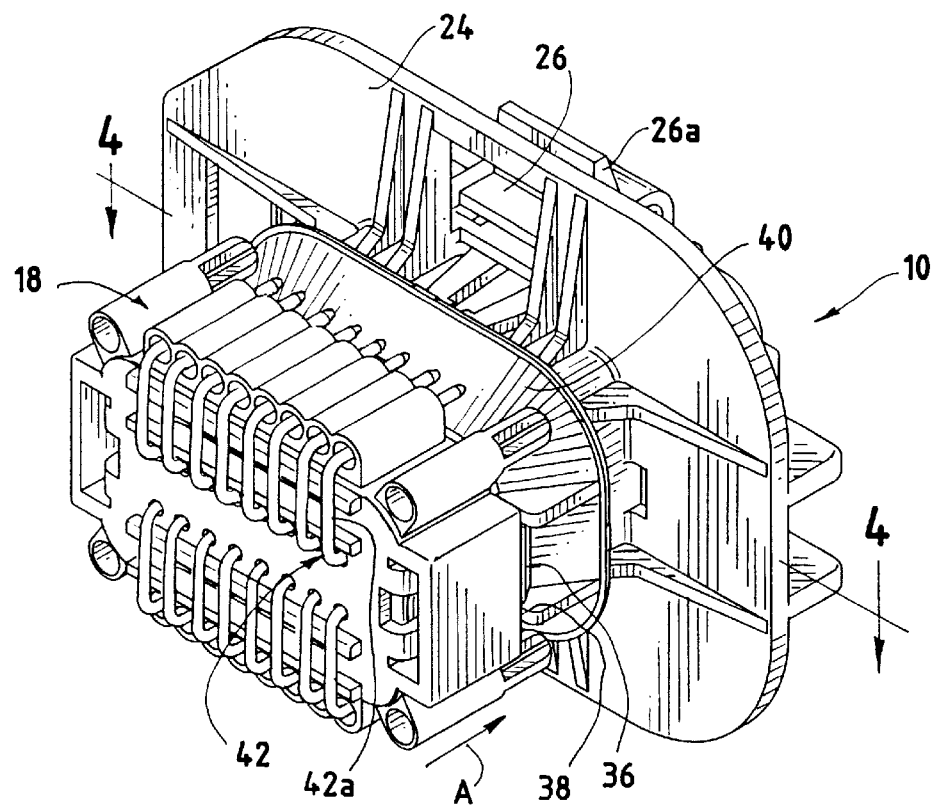
FIG. 3 is a view similar to that of FIG. 1, with the mating connector mated to the panel mounted connector.
Figure 4:
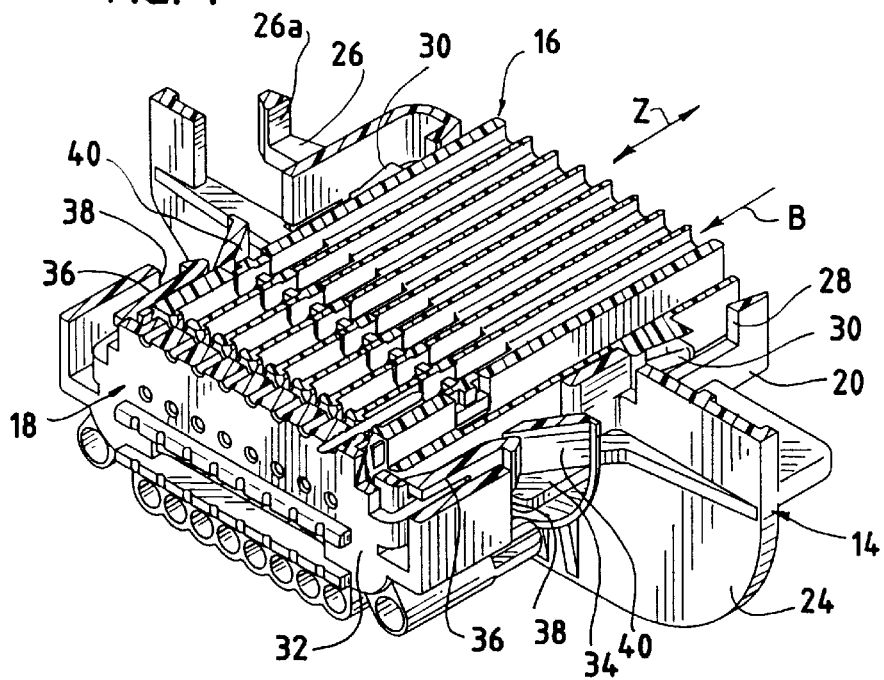
FIG. 4 is a horizontal section taken generally along line 4—4 of FIG. 3.

Referring to FIGS. 3 and 4 in conjunction with FIGS. 1 and 2, mating connector 18 is a two-part structure for assembly purposes, including a terminal-mounting part 32 and a mating part 34. The two parts are snapped together by a pair of latch arms 36 on terminal mounting part 32 which engage behind shoulders 38 on mating part 34. The mating part has an outwardly flared mouth 40 to facilitate mating connector 18 with panel mounted connector 16. Terminal mounting part 32 mounts a plurality of generally U-shaped terminals, generally designated 42, which have cross portions 42a for connection to appropriate circuit traces on a circuit board (not shown). Each of the two parts 32 and 34 of mating connector 18 is a one-piece structure molded of dielectric material such as plastic or the like.

FIG. 4 best shows one of the locking holes 28 in the side wall of central body 20 of adapter 14 and the associated locking member 30 on connector 16. It can be seen that locking members 30 have angled outer surfaces so that the locking members can snap into locking holes 28 in the bracket when the connector is inserted into the bracket in the direction of arrow "B". It also can be seen that locking holes 28 are larger than locking members 30, and this defines the degree of limited floating movement of connector 16 relative to adapter 14. This floating movement is in a "Z" direction as indicated by the double-headed arrow in FIG. 4. In other words, while flexible cantilevered arms 26 allow bracket 14 and connector 16 to float generally parallel to the panel in the "X" and "Y" directions (FIG. 2), connector 16 is capable of floating relative to bracket 14 in the "Z" direction generally perpendicular to the panel.

Figure 5:
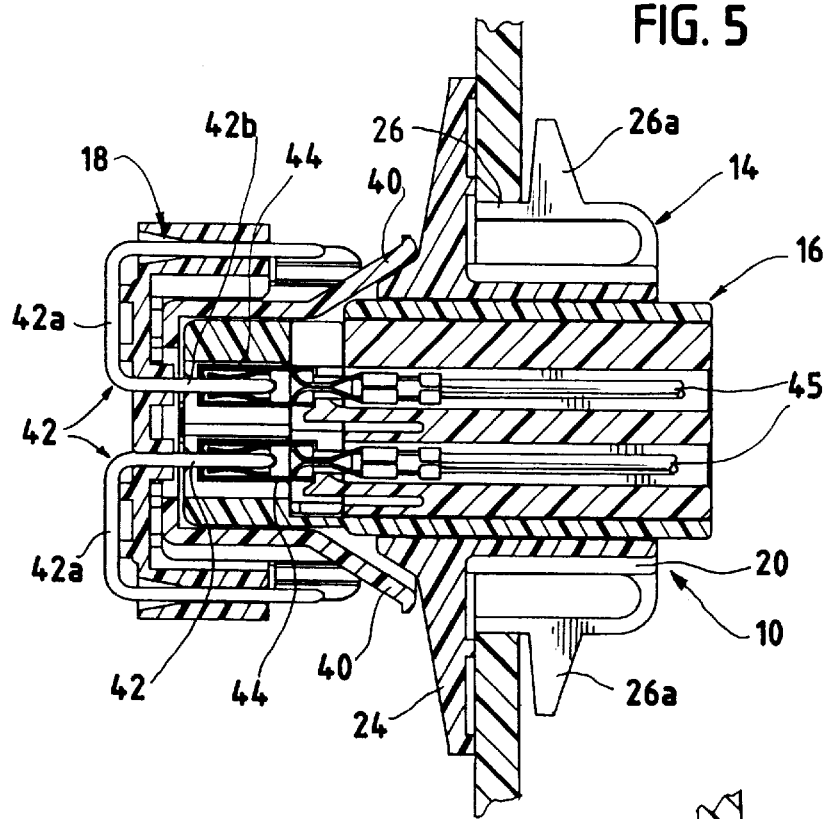
FIG. 5 is a fragmented vertical section showing two pairs of mating terminals of the mated connectors.

FIG. 5 shows a pair of the terminals 42 of mating connector 18 mated with a pair of terminals 44 of connector 16. Each U-shaped terminal 42 has a terminal pin 42b which is inserted into a respective female terminal 44 of connector 16 by a positive or interference fit. Terminals 44 are terminated to electrical wires 45. It can be understood that the mating force between the two connectors 16 and 18 comprises a composite force equal to the forces required for mating all of the terminal pins 42b and 44 of the two connectors and any forces generated by connector 16 slightly contacting connector 18. This mating force can be easily calculated and would provide a "given mating force" of the connector assembly. In fact, some terminal manufacturers provide specifications on the mating forces required for specific mating terminals.

Figure 6A:
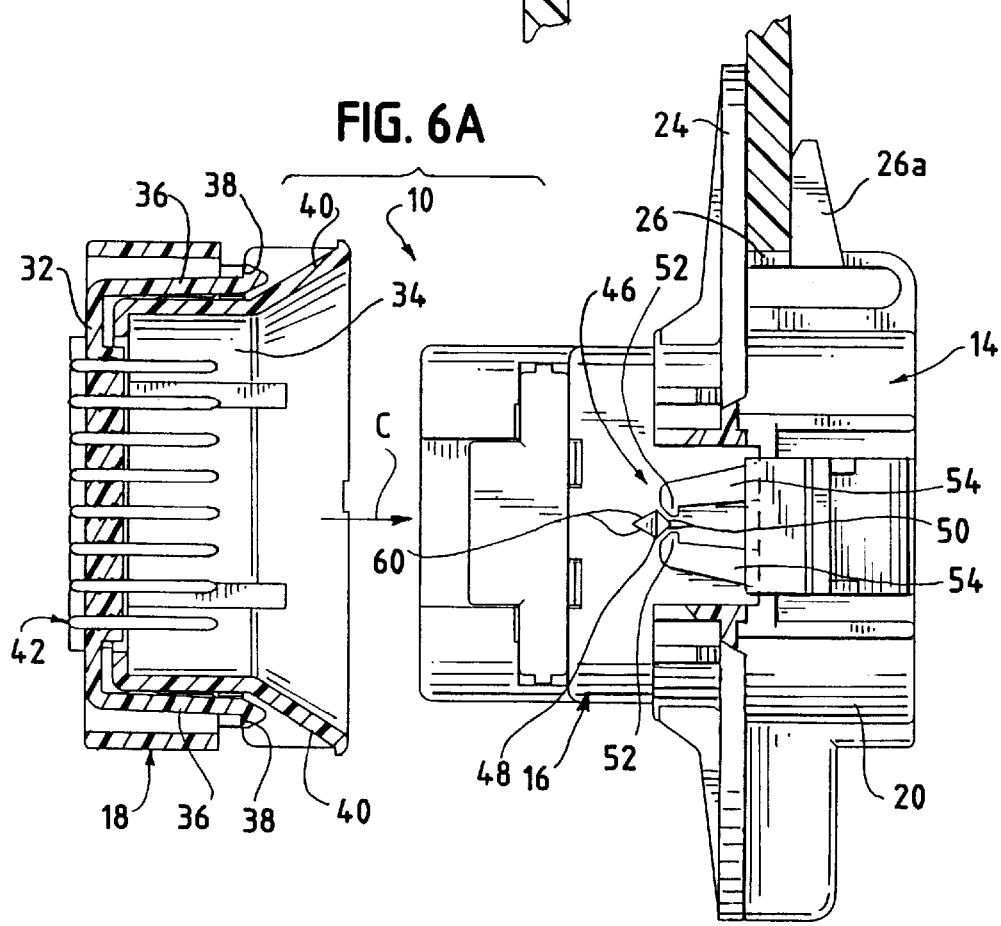
FIGS. 6A–6C are sequential views of mating the connectors and releasing the panel mounted connector.

Referring to FIG. 6A in conjunction with FIG. 1, generally, connector assembly 10 is provided with a complementarily interengaging latch means, generally designated 46, between the first or panel mounted connector 16 and adapter 14 to latch the first connector against the above-described axial floating movement in the "Z" direction and to allow mating connector 18 to be mated with the first connector with the given mating force without the floating action. Once the two connectors are mated, latch-release means 46 can be released in response to a force greater than the given mating force to allow limited axial floating movement of the two mated connectors relative to the adapter and the panel. This arrangement also allows the connector 16 to mate in multiple cycles with mating connectors having varying tolerance ranges.

More particularly, latch-release means 46 includes a triangulated detent boss 48 defining a pair of inwardly facing angled detent surfaces 50. One of the bosses is molded integrally with and projects from both the top and the bottom of first connector 16. The detent boss moves between a pair of detent surfaces 52 at the inner distal ends of a pair of latch-release arms 54 molded integrally with adapter 14. It can be understood that with a given flexing force built into arms 54, the amount of force required for pushing detent boss 48 past detent surfaces 52 is determined by the angles of detent surfaces 50 on the detent boss. According to the invention, the angles of detent surfaces 50 are such that it requires a greater force to move detent boss 48 past detent surfaces 52 of arms 54 than the given mating force of the two connectors. Therefore, the two connectors are mated before panel mounted connector 16 is capable of floating relative to adapter 14 and the panel.

Figure 6B:
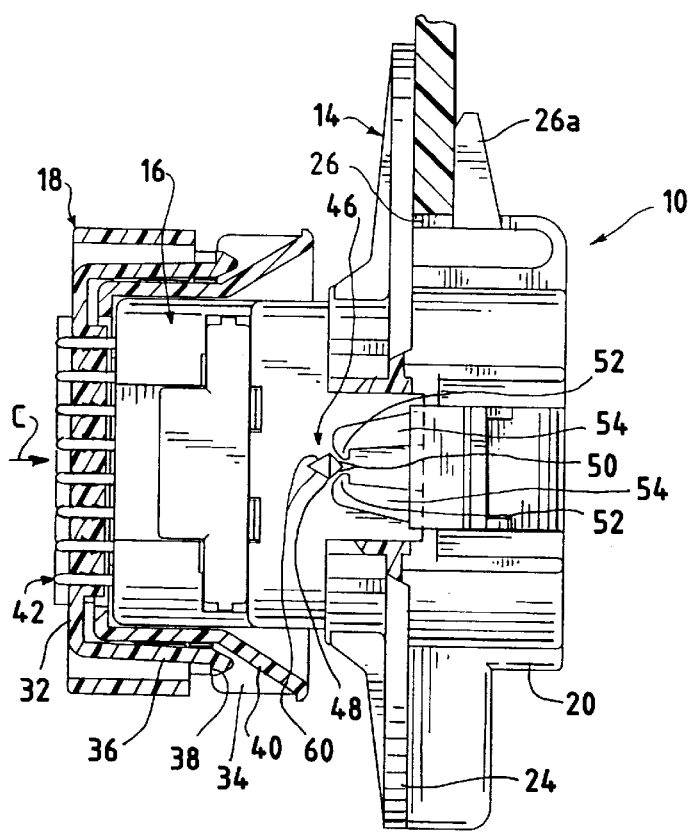
Figure 6C:
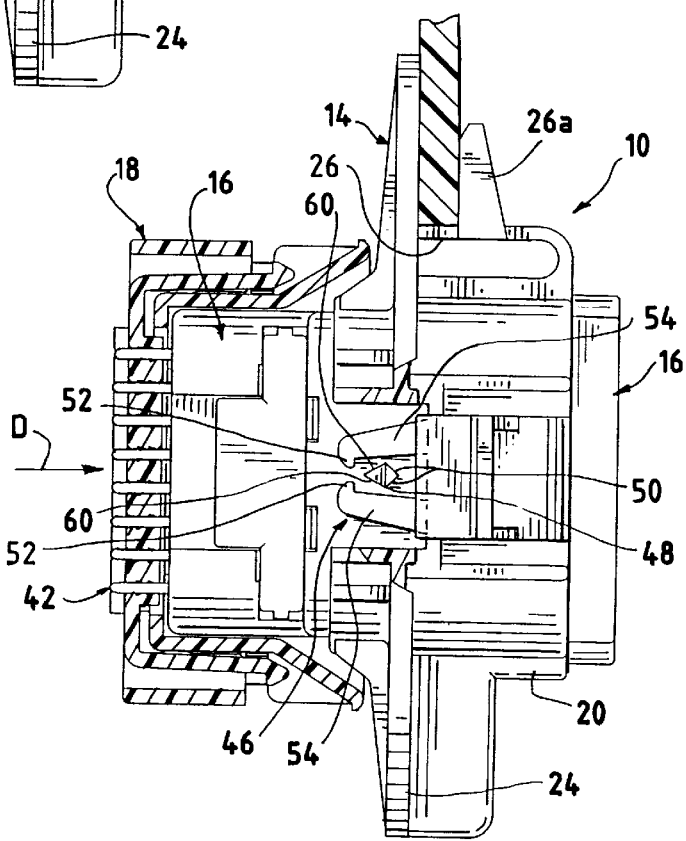

The above intended scenario is shown by comparing FIGS. 6A–6C. FIG. 6A shows mating connector 18 about to be mated with panel mounted connector 16 in the direction of arrow "C". At this point, connector 16 does not float in the "Z" direction (FIG. 4) because locking members 30 are engaged at the front of locking holes 28 so that connector 16 cannot move forwardly, and the connector cannot move rearwardly because of the engagement of boss 48 (FIG. 6A) with detent surfaces 52 of arms 54.

FIG. 6B shows mating connector 18 having been fully mated with panel mounted connector 16. The panel mounted connector still cannot float because triangulated boss 48 of latch-release means 46 still has not moved past detent surfaces 52 of arms 54. As stated above, this required force is greater than the mating forces between the two connectors.

FIG. 6C shows mating connector 18 having been moved further toward board-mounted connector 16 in the direction of arrow "D". In other words, a force greater than the mating force has now been applied to mating connector 18 to drive triangulated boss 48 of connector 16 past detent surfaces 52 of arms 54 on adapter 14. The two mated connectors now can float in the "Z" direction relative to the adapter and relative to the panel within the limits defined by locking members 30 (FIG. 4) of the board mounted connector within the enlarged locking holes 28 of the adapter.

The invention also contemplates that a reset means be provided between panel mounted connector 16 and adapter 14 to cause the latch-release means 46 to relatch or reset in response to a reset force less than an unmating force being applied to mating connector 18 in an unmating direction (i.e., opposite the directions of arrow "C" (FIG. 6B). The reset means simply is provided by configuring boss 48 in the shape of a diamond to define a pair of detent surfaces 60 facing in an unmating direction, i.e., opposite the direction of detent surfaces 50. It also can be clearly seen in FIGS. 1 and 6A–6C that detent surfaces 60 are at a lesser angle than that of detent surfaces 50 in the mating/unmating direction. With the lesser angles for detent surfaces 60, boss 48 can be pulled back outwardly past the detent surfaces of arms 54 with a lesser force which can be determined to be less than the unmating (mating) force.

Therefore, when an unmating force is applied to mating connector 18 in a direction opposite arrow "D" in FIG. 6C, boss 48 will move back outwardly of detent surfaces 52 on arms 54 to the position shown in FIG. 6B without unmating connector 18. The connector then can be completely unmated as shown in FIG. 6A, and connector 16 can no longer float in the "Z" direction, whereby the assembly is now ready for another mating cycle.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed:

1. A connector assembly for mounting through an aperture in a panel, the aperture defining an axis, comprising:

an adapter mountable in the aperture in the panel;

a first connector insertable axially into the adapter and having limited axial floating movement relative to the adapter;

a second connector mateable axially with the first connector with a given mating force, wherein said first and second connectors have complementary interengaging male and female terminals which substantially define said given mating force between the connectors; and complementary interengaging latch-release means between the first connector and the adapter to latch the first connector against said axial floating movement and to allow the second connector to be mated with the first connector with said given mating force and to release the latch-release means in response to a force greater than said given mating force to allow said limited axial floating movements wherein said complementary interengaging latch-release means comprise interengaging detent surfaces on the first connector and on the adapter, at least one of the detent surfaces being at an angle to define a release force greater than said given mating force.

2. The connector assembly of claim 1 wherein said complementary interengaging latch-release means comprise a triangulated detent boss on one of the first connector and the adapter movable between a pair of opposing detent surfaces on the other of the first connector and the adapter.

3. The connector assembly of claim 1, including complementarily interengaging reset means between the first connector and the adapter to cause the latch-release means to relatch in response to a reset force less than an unmating force being applied to the second connector in an unmating direction.

4. The connector assembly of claim 3 wherein said complementarily interengaging reset means comprise interengaging detent surfaces on the first connector and on the adapter, at least one of the detent surfaces being at an angle to define a reset force less than said unmating force.

5. The connector assembly of claim 4 wherein said complementarily interengaging reset means comprise a triangulated detent boss on one of the first connector and the adapter movable between a pair of opposing detent surfaces on the other of the first connector and the adapter.

6. A connector assembly for mounting through an aperture in a panel, the aperture defining an axis, comprising:

an adapter mountable in the aperture in the panel;

a first connector insertable axially into the adapter and having limited axial floating movement relative to the adapter;

a second connector mateable axially with the first connector with given mating and unmating forces;

complementary interengaging latch-release means between the first connector and the adapter to latch the first connector against said axial floating movement and to allow the second connector to be mated with the first connector with said given mating force and to release the latch-release means in response to a force greater than said given mating force to allow said limited axial floating movement;

complementarily interengaging reset means between the first connector and the adapter to cause the latch-release means to relatch in response to a reset force less than an unmating force being applied to the second connector in an unmating direction; and said complementary interengaging latch-release means including first interengaging angled detent surfaces on the first connector and on the adapter, said complementary interengaging reset means including second angled detent surfaces on the first connector and on the adapter, the first detent surfaces being at an angle to define a release force greater than said given mating force and the second detent surfaces being at an angle to define a reset force less than said given unmating force.

7. The connector assembly of claim 6 wherein said first and second connectors have complementarily interengaging male and female terminals which substantially define said given mating and unmating forces between the connectors.

8. The connector assembly of claim 6 wherein said first and second angled detent surfaces include opposing detent surfaces on opposite sides of a diamond-shaped detent boss on one of the first connector and the adapter.

9. A connector assembly for mounting through an aperture in a chassis, comprising:

a bracket mountable in the aperture at the chassis;

a first connector mountable to the bracket and having limited floating movement relative thereto;

a second connector mateable with the first connector with a given mating force, wherein said first and second connectors have complementary interengaging male and female terminals which substantially define said given mating force between the connectors; and complementary interengaging latch-release means between the first connector and the bracket to latch the first connector against said floating movement and to allow the second connector to be mated with the first connector with said given mating force and to release the latch-release means in response to a force greater than said given mating force to allow said limited floating movement, wherein said complementary interengaging latch-release means comprise interengaging detent surfaces on the first connector and on the bracket, at least one of the detent surfaces being at an angle to define a release force greater than said given mating force.

10. The connector assembly of claim 11 wherein said complementarily interengaging latch-release means comprise a triangulated detent boss on one of the first connector and the bracket movable between a pair of opposing detent surfaces on the other of the first connector and the bracket.

11. The connector assembly of claim 9, including complementarily interengaging reset means between the first connector and the bracket to cause the latch-release means to relatch in response to a reset force less than an unmating force being applied to the second connector in an unmating direction.

12. The connector assembly of claim 11 wherein said complementarily interengaging reset means comprise interengaging detent surfaces on the first connector and on the bracket, at least one of the detent surfaces being at an angle to define a reset force less than said unmating force.

13. The connector assembly of claim 12 wherein said complementarily interengaging reset means comprise a triangulated detent boss on one of the first connector and the bracket movable between a pair of opposing detent surfaces on the other of the first connector and the bracket.

* * * * *